2,976,259

2,2'-DIHYDROXY-4-ALKOXYBENZOPHENONES AS ULTRAVIOLET LIGHT ABSORBERS FOR RESINS

William B. Hardy, Bound Brook, Warren S. Forster, Basking Ridge, and Ralph A. Coleman, Middlesex, N.J., assignors to American Cyanamid Company, New York, N.Y., a corporation of Maine No Drawing. Filed Sept. 5, 1956, Ser. No. 607,986

8 Claims. (Cl. 260—45.95)

This invention relates to dispersions of certain hydroxylated benzophenone ethers in a wide variety of organic carrier materials.

This is a continuation-in-part application of copending application Serial No. 522,832 filed July 18, 1955, now abandoned. The hydroxylated benzophenone ethers per se are claimed in a companion application Serial No. 592,509 filed June 20, 1956, now U.S. Patent No. 2,853,-521 granted September 23, 1958.

Various benzophenones have been used as ultraviolet light absorbing agents. However, many of these are not satisfactory. A good ultraviolet absorber should absorb the ultraviolet light and at the same time be a substantially colorless material which imparts little or no color to compositions in which it is used. Also, it should be sufficiently stable to withstand the conditions of forming or curing of plastics or other carriers, and should absorb ultraviolet light sufficiently to protect the carrier composition as well as any materials being shielded therewith against yellowing, degradation or decomposition upon exposure to ultraviolet light. The absorbing agent must itself be light-stable for long periods, for many compounds like aspirin, chalcones, coumarins, certain amines and so-called "brighteners" absorb ultraviolet light but are rapidly decomposed by light and therefore useless for the present purposes. Furthermore, the compound must have sufficient solubility in various types of materials so that it may be easily incorporated into various plastic formulations. Solubility is especially important, since an incompletely dispersed product affords poor protection.

Generally, an effective ultraviolet absorber should have its peak absorption above a wave length of 320 millimicrons. The absorption peak may be at a higher wave length, as long as absorption drops off sufficiently as it approaches the visual range so that the absorbing compound displays little or no visible color. In addition, to be effective, it should show a high degree of absorbency in the desired wave length range. As a measure of the degree of absorbency, an absorption index may be used. This represents the degree of absorption of light of a selected wave length per amount of material with a higher absorbency index indicating greater absorption. For the most desirable ultraviolet protection, the peak absorbency index should occur at a wave length sufficiently below the visual range so that the absorbing compound has little or no yellow color.

Of the compounds used as ultraviolet absorbers, many have the disadvantages of showing various degrees of yellow color and of poor solubility. If the compound has a yellow color, it also imparts that color to transparent and light-colored carrier compositions. This is undesirable since one of the functions of the absorber is to prevent yellowing from the action of ultraviolet light. To evaluate the visible yellow color of the absorbing compound, the absorption in the blue region of the visible range may be measured. This may be conveniently done by determining the absorption index at a wave length of 420 millimicrons.

An object of this invention is to provide an improved material capable of absorbing ultraviolet radiation.

Another object of this invention is to provide an improved material capable of forming films and absorbing ultraviolet light.

A further object of this invention is to provide improved resinous compositions capable of absorbing ultraviolet light.

Other objects and advantages of the invention will be apparent to those skilled in the art upon consideration of the detailed disclosure hereinbelow.

We have found that benzophenones of the structure:

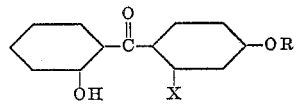

in which X represents hydrogen or a hydroxyl group and R is an alkyl, aralkyl, substituted alkyl or alkenyl radical, form a class of ultraviolet absorbers having unusual and highly advantageous properties.

The present invention comprises substantially uniform molecular dispersions of these substituted benzophenones in various organic carriers. Narrower aspects of the invention relate to the preferred resinous carriers and the preferred species of hydroxylated benzophenone ethers.

The new absorbing agents have especially desirable properties as ultraviolet absorbers in the mixtures of the present invention. They have low absorbency indices at 420 millimicrons and accordingly, very little yellow color. They show high absorption in the desirable ranges and at the same time display low absorption in the visual ranges. They, furthermore, show superior solubility in various organic solvents and plasticizers, and the like, and have more desirable properties than many of the ultraviolet absorbing compounds in commercial use.

The absorbing agents utilized in the invention show a unique and unexpected effect which greatly adds to their utility. They have the unusual property of possessing different wave lengths of maximum absorption, depending on the solvent or carrier in which they are dissolved or dispersed. In hydrocarbon type solvents, such as aromatic hydrocarbons (xylene, toluene, etc.), aliphatic hydrocarbons (hexane), or hydrocarbon polymers (polyethylene, polypropylene, and the like), the wave length of maximum absorption is in the vicinity of 350 millimicrons. This gives a maximum of protection to polyethylene and similar type plastics where the natural opacity of the resin conceals the very slight yellow color which accompanies a high wave length of maximum absorption. The color is slight—much less than would be expected with such a high wave length of absorption, but even such a slight color would often be undesirable in an ultraviolet absorber to be used in a crystal clear plastic such as a polyacrylate or a modified alkyd. It is desirable for an ultraviolet absorber to have a wave length of maximum absorption as high as is possible without developing visible color. It is therefore most unexpected and highly advantageous that the compounds used herein possess the unique property of having a wave length of maximum absorption in the vicinity of 330 millimicrons when dissolved or dispersed in oxygenated solvents, resins or other carriers. This difference is enough that the absorption in the visible range is virtually eliminated and extremely little or no visible color is observed. Such solvents and resins include aliphatic alcohols like methanol, isopropanol, tertiary butanol, cyclohexanol, lauryl alcohol, stearyl alcohol, ethyene gycol, gycerol, 1,4-butanediol; polyethylene and polypropylene glycols with molecular weights of 400, 1000, 6000 and more; aliphatic and aromatic esters as exemplified by ethyl acetate, benzyl propionate, methyl benzoate, tricresyl phosphate, octyl diphenyl phosphate, glyceryl triacetylricinoleate, dibutyl sebacate, dimethyl phthalate, methyl acetylricinoleate, triethyleneglycol di-2-ethylhexoate, and the di-2-ethylhexyl esters of orthophosphoric, adipic, sebacic and phthalic acids; and ketones like acetone, methyl isobutyl ketone, methyl ethyl ketone, methyl vinyl ketone, and cyclohexane, and resins such as methyl methacrylate, cellulose propionate, vinyl acetate, ethylene glycol fumarate, propylene glycol maleate, glyceryl phthalate polymers, and the like. This shift in wave length of maximum absorption thus permits the utilization of certain compounds of our invention in a wide variety of resins and other organic carriers to give maximum protection without discoloring transparent carriers. This effect is observed in both the di- and monohydroxy types of ultraviolet absorbers used in this invention and it is especially pronounced in the former, as, e.g., 2,2'-dihydroxy-4-methoxybenzophenone.

The aforementioned absorbers may be prepared in several ways. One is by the usual Friedel-Crafts type of reaction in which an appropriate alkoxy benzene is reacted with the proper alkoxybenzoyl chloride in the presence of a catalyst. Alkoxy groups ortho to the carbonyl in either ring of the benzophenone are usually dealkylated during the reaction. This method is usable only when the ortho alkoxyls are lower alkoxyls such as methoxy or ethoxy. Higher alkoxy groups are not as readily dealkylated.

An alternative method is based on the selective reactivity of the para hydroxyl group in polyhydroxybenzophenones. As starting materials one uses either 2,4'dihydroxybenzophenone or 2,2',4-trihydroxybenzophenone. The para hydroxyl may be selectively etherified. The etherifying reagents may be dialkyl sulfates such as diethyl or dimethyl sulfate; alkyl halides such as methyl, ethyl, propyl, isoamyl, hexyl, heptyl, lauryl, or octadecyl chlorides, bromides or iodides; aralkyl halides such as benzyl chloride, bromide, or iodide; substituted alkyl halides such as ethylene chlorhydrin, propylene chlorhydrin and the corresponding bromohydrins; halogenated compounds with a carbonyl group such as chloracetic acid, bromoacetic acid, α-chloropropionic acid, α-bromobutyric acid, chloracetonitrile, bromoacetonitrile, α-bromopropionitrile, chloracetaldehyde, chloracetone and chloracetophenone; and alkenyl halides such as allyl bromide, methallyl bromide, crotyl chloride, and cinnamyl chloride, and like compounds. In each case the corresponding substituent becomes the group R in the general formula:

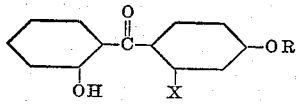

with the nature of X depending on which benzophenone was etherified, in one case being hydrogen and in the other being hydroxyl.

A variety of mono- and dihydroxybenzophenone ethers in this class and their preparation are specifically described in the examples hereinbelow. To date, the optimum results have been obtained with 2-hydroxy-4'-methoxybenzophenones and especially with 2,2'-dihydroxy-4-methoxybenzophenone when uniformly dispersed in appropriate carriers; therefore, these constitute the preferred species of ultraviolet absorbing components of the present mixtures. In general, lower alkyl ethers containing 1 to 4 carbon atoms in the aforesaid R group appear to offer the greatest promise.

The ultraviolet light absorbers of the present mixtures are soluble in a wide variety of organic solvents to a surprising extent upon comparison with other ultraviolet absorbing agents of closely related chemical structure. This is strikingly apparent upon inspection of the table hereinbelow, wherein the solubilities of two comparative examples of known hydroxybenzophenone ethers are set forth in the two left columns while those of two agents employed in the present compositions are set forth in the two columns on the right.

TABLE I

*Solubilities in various solvents*

[g./100 g. solutions at 25° C.]

| Solvent | (Comparative) 2-hydroxy-4,4'-dimethoxybenzophenone | (Comparative) 2,2'-dihydroxy-4,4'dimethoxybenzophenone | 2-hydroxy-4'-methoxybenzophenone | 2,2'-dihydroxy 4-methoxybenzophenone |
|---|---|---|---|---|
| 95% ethanol | 0.7 | 0.5 | 10.8 | 21.4 |
| n-hexane | 0.3 | 0.1 | 6.0 | 2.3 |
| benzene | 12.2 | 5.2 | 73.8 | 46.6 |
| xylene | 5.7 | 2.9 | 6.2 | 30.6 |
| di-2-ethylhexyl-phthalate | 2.7 | 1.3 | 27.3 | 16.6 |
| tricresyl phosphate | 4.0 | 1.0 | 24.0 | 20.7 |
| tri-2-ethylhexyl phosphate | 2.4 | 2.8 | 26.7 | 31.1 |
| di-2-ethylhexyl sebacate | 1.7 | 1.1 | 27.3 | 14.8 |

These greatly improved solubilities in contrast with those of the prior art absorbing agents are of real significance in preparing the mixtures of the present invention inasmuch as it is frequently desirable to dissolve the ultraviolet absorbing compound in a solvent in order to incorporate it into a carrier or to emulsify such a solution with a suitable emulsifying or dispersing agent in order to incorporate that solution into a solution of the carrier material in water or another solvent which may be immiscible with the organic solvent containing the ultraviolet absorber. High solubility of the selected benzophenone compounds is important in enabling the compound to be uniformly distributed in molecular dispersion throughout the carrier with only an insignificant amount of organic solvent. Such solvent is desirably later evaporated from some of the present mixtures, while in others, a nonvolatile solvent may remain in the final composition to serve as a plasticizer also. It will be observed that the phosphates and esters in Table I are well known plasticizers for vinyl polymers; therefore, these materials are mutual solvents both for the resin and the hydroxylated benzophenone ethers and need not be removed from the final composition.

The present compositions are purely physical mixtures inasmuch as no reaction takes place between the hydroxylated benzophenone ethers and the carrier materials. The compositions are remarkably stable under a wide variety of conditions such as those used in curing thermosetting resins to the three-dimensional state wherein they are infusible and insoluble, or in shaping thermoplastic polymers. However, the compositions should not be heated above the point at which the particular ultraviolet absorber present will be decomposed which is generally at temperatures of about 300° C. and higher. Similarly, although the substituted benzophenone ethers are stable under acid, neutral and moderately alkaline conditions, pH's above about 11 or 12 are sometimes undesirable since they tend to form colored compounds apparently due to the formation of salts by the replacement of hydrogen atoms in the hydroxyl radicals by alkali metal atoms; however, this difficulty can be readily overcome by neutralizing or acidifying the mixture if that is permissible.

In general, a tremendous variety of organic carrier materials are suitable for the present purposes due to the excellent stability of the ultraviolet absorbers and the myriad of applications to which the compositions lend themselves. In connection with the applications, it should be borne in mind that the mixtures described herein are not limited to those wherein the carrier material per se requires protection against deleterious effects of ultraviolet light in the form of yellowing, other discoloration, resin degradation or other chemical decomposition, as the present compositions may be employed as coatings or as separate films or sheets to protect other articles like dyed textile fabrics, colored photographs, etc., against fading and chemical degradation or decomposition by preventing ultraviolet light from reaching said fabrics and photographs or by minimizing the amount of such light which does reach those objects. The new compositions may be applied in an infinite number of ways to protect various articles and materials from ultraviolet light. For example, either stained or unstained wood which is either varnished or unvarnished and also painted metal objects may be coated with a polish or wax containing a silicone resin and/or a natural ester wax (carnauba, candelilla, montan, etc.) and/or paraffin wax along with an organic solvent and an appropriate quantity of the ultraviolet absorbing agent, which may range as high as about 15% of the total weight, in order to minimize bleaching, darkening or weathering of the wood, stain or paint from the ultraviolet spectrum in sunlight. The ultraviolet absorbing agent may be incorporated in transparent lacquers containing nitrocellulose or methyl methacrylate polymers to protect both the dried lacquer film against discoloration or decomposition and also to shield the substrate under the film. Varnishes containing natural resins and gums such as Damar, Elemi, shellacs or Manila gums may similarly serve as carriers for the ultraviolet absorbing compounds. Also yellowing and discoloration of light-colored and white paints, enamels and especially unsaturated polyester resin laminating and molding compositions can be minimized or substantially eliminated by the incorporation therein of the aforesaid substituted benzophenones. Transparent and translucent unsaturated polyester resins resistant to degradation by ultraviolet radiation represent other species of the present invention of great utility. The protection of foodstuffs and other packaged items by transparent wrappings of regenerated cellulose, polyethylene glycol terephthalate, vinylidene chloride copolymers, polyvinyl chloride, polyethylene, and the like, provides another area of important utilization. It is also contemplated that the fading of dyed textile fabrics and their loss of strength upon exposure to sunlight can be minimized by dispersing an ultraviolet absorber in the various well-known textile finishing resins. Inasmuch as the deposit of such resins on the cloth amounts to only a few percent of the weight of the cloth, heavy concentrations of the absorbing agent in the resin are recommended. One method of obtaining the protective coating on the fibers is to disperse a concentrated solution of the absorber in xylene in an aqueous pad bath containing the usual concentration of methylated trimethylol melamine in either the noncolloidal or the acid colloid form using sodium lauryl sulfate or the di-2-ethylhexyl ester of sodium sulfosuccinate as an emulsifier. In another variation, the fabric which might first be treated with a dilute xylene solution of the ultraviolet absorber is applied first to the fabric which is then dried and thereafter treated in the aqueous resin solution and finally cured in the usual manner.

Although synthetic resins appear to be the most important category of carrier materials in the novel compositions, nevertheless, it is apparent that other organic carriers are also suitable including natural and synthetic waxes like hydrogenated castor oil, polyalkylene glycols and those mentioned earlier. Further, the carrier may be one or more of the wide variety of natural resins and gums which are so well known in the art as to need no repetition here. The synthetic waxes and natural resins and gums all are macromolecular. In general, it may be said that any carrier material capable of forming solid films, including coatings, laminae, sheets, layers, etc., or of being cast or molded into articles is operative in the present compositions. Although translucent, transparent and light-colored opaque carrier materials are considered to be more important from a commercial standpoint, dark and opaque carrier agents are also within the scope of this invention, inasmuch as the fading of an unpigmented thermoplastic resin containing sufficient blue dye to render it opaque has been greatly reduced by the incorporation of an ultraviolet absorber of the type described herein.

Among the tremendous array of suitable synthetic resin carrier materials capable of forming either rigid plastics or elastomers may be mentioned the acrylic resins as exemplified by the polymers of methyl acrylate, acrylamide, methylol acrylamide, acrylonitrile, and copolymers of these with styrene, vinyl pyridines, etc.; linear superpolyamides such as nylon of both the adipamide and caprolactam types; neoprene; condensates of aldehydes, especially formaldehyde and formaldehyde engendering substances such as paraformaldehyde and hexamethylene tetramine with urea, thiourea and aminotriazines such as melamine and benzoguanamine as well as their ethers with aliphatic alcohols as exemplified by methanol and butanol; modified and unmodified condensates of hydroxy benzenes like phenol, resorcinol, etc., with the aforementioned aldehydes; silicones such as dimethyl and methyl hydrogen polysiloxanes; unsaturated, saturated and modified alkyd resins including the combinations of unsaturated polyesters with cross-linking monomers as described in detail hereinbelow; the polyolefins, as for instance, the polymers of ethylene, propylene, isobutylene, etc.; vinyl polymers including polyvinyl butyral and other acetals, polyvinyl chloride, polyvinyl acetate and its hydrolysis products, polyvinyl chloride-acetate, styrene and substituted styrene (especially of ring-substituted styrenes, e.g., o-, m- and p-methyl styrenes), polymers and copolymers with acrylonitrile, and other terminal ethylenic monomers as mentioned hereinbelow; copolymers of vinylidene chloride with vinyl chloride; cellulose ethers as exemplified by ethyl and methyl cellulose; cellulose esters including the nitrate, acetate, propionate, etc.; regenerated cellulose; fluorocarbon polymers such as polytetrafluoroethylene and polytrifluorochloroethylene; rubber hydrochloride; chlorinated rubber; polyethylene glycol and polypropylene glycol; epoxy resins as exemplified by the condensates of epichlorohydrin with bis-phenol, diphenylol propane, etc.; polyurethane resins such as the combination of 2,4-tolylene diisocyanate with one of the linear polyesters described herein, as well as copolymers and simple mixtures of homo- or copolymers of any two or more of such materials. This list is not meant to be limiting or exhaustive but merely to illustrate the wide range of resinous carriers which may be employed in the present invention as the vast majority of synthetic resins are suitable for the purpose provided that they do not react with the hydroxylated benzophenone ethers disclosed herein and provided that there is a suitable means for molecularly dispersing said ethers therein.

The preparation, shaping, curing, extrusion, calendering, casting, molding or other forming of these resins is well understood by those skilled in the art and accordingly need not be detailed here. Likewise, the formulation of such resins with various additives including catalysts, promoters, plasticizers, fillers, reinforcing agents like textile and glass fibers and fabrics, colorants including pigments and dyes, mold lubricants, flow promoters, foaming agents, inhibitors to promote storage life, thickeners, fire-retardant agents and other conventional additives is well known and need not be set forth here.

Outstanding results are obtained with certain of the above resins, and since these are frequently employed out of doors, they constitute the preferred species, namely, polyethylene, flexible and rigid polyvinyl chloride compositions and polystyrene. Unlike the commercially available ultraviolet absorbers, some of which are chemically related, the hydroxylated benzophenone ethers employed here display a remarkably good solubility in polyolefins. This is highly advantageous in simplifying the introduction of the present ultraviolet absorbing agent into polyethylene and in not altering the physical characteristics of the polyethylene to any significant degree.

Other very important species of resinous carriers include nylon, methyl methacrylate polymers, polymethylstyrenes, polyvinyl butyral, unsaturated linear polyesters in combination with styrene or another monomeric crosslinking agent, cellulose acetate and regenerated cellulose. The compositions of this invention include cured infusible polymeric products containing the herein designated benzophenone compounds as well as the polymerizable thermosetting formulations from which they are prepared.

For most purposes the compositions of this invention may desirably contain between about 0.001 and about 5% of the selected hydroxylated benzophenone ether based on the total weight of solids in the final product. In many applications a content of about 0.05 to about 0.5% is most suitable. However, where relatively thin films or layers are utilized as in polishes and waxes, the quantity of benzophenone compound may be increased up to a maximum of about 15% to provide the desired absorption of ultraviolet light. These ethers may be introduced into the carrier materials in various ways, chiefly depending on the nature of the carrier material, in order to procure a molecular dispersion of the benzophenone compound in the final composition. Thus, in the case of many vinyl compounds, like polyvinyl chloride, they may be dissolved in the plasticizer first and introduced into the resin formulation in that solution. As pointed out hereinabove, enhanced results are obtained when the carrier contains a substantial quantity of an oxygenated compound as either resinous material or plasticizer or mutual solvent as that produces a desirable shift in absorption away from the visible light range. In the case of polyethylene, the benzophenone compound may be introduced as a powder or granules and it dissolves in the polymer upon milling at an elevated temperature. In many molding compounds as for instance, those containing urea-formaldehyde condensates, the powdered ultraviolet absorber is merely thoroughly mixed into the molding composition and dissolves therein during the molding operation wherein the urea resin fuses before curing. Where an aqueous solution or dispersion of a resin like melamine-formaldehyde is employed for impregnating paper, textiles, etc., the benzophenone compound may be first dissolved in a relatively small amount of a suitable organic solvent and thereafter dispersed in the aqueous medium with an emulsifying agent as described earlier. The absorber may be dissolved in alkaline cellulose xanthate dope prior to regenerating the dope in an acidic bath in the form of filaments or sheets with the substituted benzophenone compound molecularly distributed therethrough. In addition, when intended for use with carriers which form a coating or film by drying, the absorbing compound may be introduced into the liquid carrier in solution or emulsion in a liquid compatible with the liquid carrier formulation and the solvent or emulsifying medium evaporated under the selected drying conditions. In some instances it may be desirable to introduce the benzophenone as a solid, or in solution or emulsion along with unsaturated polymerizable monomeric materials and polymerize the mass to form the desired dispersion in a thermoplastic carrier, and the substituted benzophenone ether may be similarly introduced when preparing a fusible thermosetting resin precondensate as the carrier in order to obtain the necessary molecular dispersion in the final article.

In the preparation of unsaturated polyester resins useful as carriers in the present invention, one may use the alpha, beta unsaturated polycarboxylic acids such as maleic, fumaric, aconitic, itaconic, monochloromaleic anhydride and the like. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to use saturated polycarboxylic acids also, that is, those which are free of nonbenzenoid unsaturation, one may use such acids as phthalic, malonic, succinic, glutaric, sebacic and chlorinated polycarboxylic acids such as tetrachlorophthalic anhydride, and the like, but in amounts less than a larger proportion of the total amount of polycarboxylic acids present. Whenever available, the anhydrides of these acids may be substituted therefor in whole or in part.

As polyhydric alcohols which may be used to prepare the unsaturated polyesters of the present invention, it is preferred to employ those alcohols having only two hydroxy groups, optionally with minor amounts of alcohols having three or more hydroxy groups. Among the suitable alcohols are ethylene glycol, diethylene glycol, propylene glycol, dipropylene glycol, butanediol 1-4, butanediol 1-3, butanediol 1-2, pentanediol 1-2, pentanediol 1-3, pentanediol 1-4, pentanediol 1-5, hexanediol 1-6, and the like, also glycerol, pentaerythritol, dipentaerythritol, and the like.

The unsaturated linear alkyd component may be formed in the conventional manner by reacting one or more of these polycarboxylic acids with one or more of the polyhydric alcohols to produce material having an acid number below about 55, and desirably between about 35 and 40.

The cross-linking monomer for the polyester resin is a polymerizable material having a $CH_2=C<$ group and desirably boiling above 60° C. Amongst these polymerizable compounds are styrene, side chain substituted styrenes such as the alpha methylstyrene, alpha ethylstyrene, and the like, or ring-substituted styrene, such as ortho, meta and para-alkyl styrenes such as o-methylstyrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the dially ester of muconic acid, diallyl itaconate, diallyl chlorophthalate, diallyl dichlorosilane, the diallyl ester of endomethylene tetrahydrophthalic anhydride, triallyl tricorballylate, triallyl aconitate, triallyl cyanurate, triallyl citrate, triallyl phosphate, trimethallyl phosphate, tetraallyl silane, tetraallyl silicate, hexallyl, disiloxane, and the like.

Many examples of the preparation, use and suitable additives for such unsaturated polyester resin formulations are disclosed in detail in Ellis Patent No. 2,255,313 and Kropa Patents Nos. 2,443,735 to 2,443,741, inclusive.

For a better understanding of the nature and objects of this invention, reference should be had to the accompanying examples in which all parts are expressed in terms of weight unless otherwise specified therein. These examples serve to illustrate the invention rather than define its scope.

*Example 1*

To a mixture of 550 parts of dry chlorobenzene and 108 parts of anisole is added 135 g. of aluminum chloride. The mixture is stirred and cooled during the addition. There is then added, gradually, 136.4 parts of ortho-methoxybenzoyl chloride, keeping the temperature between about 15 and 23° C. The mixture is gradually heated to 90° C. and held at 88–92° C. until the reaction is complete. It is decomposed in a mixture of 2000 parts of ice and 160 parts of concentrated hydrochloric acid. The mixture is steamed, giving readily separable layers. The chlorobenzene layer is separated, filtered to remove mechanical impurities, and then steam distilled free of chlorobenzene. The water is removed from the residue and the viscous insoluble oil is taken up in 395 parts of warm 95% alcohol. The solution is cooled and the 2-hydroxy-4'-methoxybenzophenone which crystallizes is separated by filtration and washed with alcohol.

One part of the above product is dissolved in 1000 parts by volume of methanol. Five ml. of this solution is added to 100 parts of polymethylmethacrylate powder and mixed therein. The alcohol is evaporated and the residual material is molded at 325° F. The resulting product shows improved resistance to ultraviolet light.

*Example 2*

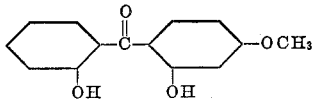

A mixture of 88 parts of 1,3-dimethoxybenzene, 550 parts of chlorobenzene, and 162 parts of aluminum chloride is prepared. To this mixture is added gradually with cooling 102.4 parts of orthomethoxybenzoyl chloride. The mixture is then gradually heated, with stirring, to a temperature of 88° C. After stirring at that temperature a short time, the mass can no longer be stirred, and it is removed from the flask and decomposed in 2000 parts of ice and 140 parts of concentrated hydrochloric acid. Steam is used to clean out the flask. The heated mixture is filtered through glass wool and the chlorobenzene layer is separated and steamed free of chlorobenzene. The residue is heated with 315 parts of 95% alcohol and a white insoluble by-product which forms is removed by filtration. The alcohol solution is diluted with water but does not crystallize. The oil layer is then taken up in 158 parts of alcohol, and distilled under reduced pressure (about 1 mm.). The product is cut into the following fractions:

(1) 6.5 g. distilling at 164–185° C.
(2) 30.6 g. distilling at 170–175° C. heated temperature, through an 8" helix packed column. This second fraction, which is essentially 2,2'-dihydroxy-4-methoxybenzophenone, in the form of a thick yellow oil, solidifies after standing several days to a waxy solid.

The ultraviolet absorbers indicated in the table below are milled into polyethylene in proportions of 0.05 to 0.2% at 325° F. and the various mixtures are pressed into sheets 0.010 to 0.020 inch thick. The sheets are then exposed in a Fadeometer to ultraviolet light. The oxidation of the polymer is followed by the increase in the intensity of the carbonyl infrared band. The table gives the relative amounts of observed oxidation, taking unprotected pure polyethylene as the standard of 100%.

```
                                                    200 hours
0.05% 2-hydroxy-4-methoxy-4'-tertiary butyl benzo-
  phenone _____ 72
0.10% 2-hydroxy-4-methoxy-4'-tertiary butyl benzo-
  phenone _____ 76
0.1%  2,2'-dihydroxy-4-methoxybenzophenone _____ 24
0.2%  2,2'-dihydroxy-4-methoxybenzophenone _____ 20
```

It is apparent that the latter two resinous compositions of the present invention are far more resistant to oxidation induced by ultraviolet radiation than the first two mixtures which contain a known and chemically related ultraviolet absorbing compound.

*Example 3*

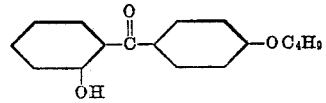

A mixture of 21.4 parts of 2,4'-dihydroxybenzophenone, 15 parts of butylbromide, 200 parts of alcohol, and 6.0 parts of soda ash is heated at reflux until the reaction is substantially complete. The resulting crude 2-hydroxy-4'-butoxybenzophenone is isolated by drowning in water and filtered. It is purified by recrystallization from toluene.

1 parts of the purified product is dissolved along with 100 parts of polyvinyl butyral resin in 900 parts of 95% ethanol with thorough mixing. The solution is poured into a suitable container and the solvent evaporated to form a disc. The latter is transferred to a platen press having 0.1 inch thick shims between the platens, pressed for 35 seconds at 320° F. and then cooled under a pressure of 20 tons between polished platens to form a clear 5" diameter disc of 0.1 inch thickness. A blue auto upholstery fabric is subjected to prolonged ultraviolet radiation from a General Electric Company S-1 sunlamp with this thermoplastic disc interposed between the sunlamp and the upholstery fabric, then the fabric is examined visually. The area shielded by the disc is of a considerably darker shade (i.e., less faded) than unprotected areas of the fabric which indicates that a great deal of the ultraviolet light is absorbed by the disc.

*Example 4*

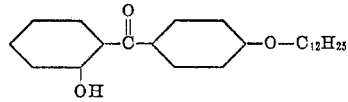

The procedure of Example 3 is followed using an equivalent amount of lauryl bromide in place of the butyl bromide to produce 2-hydroxy-4'-dodecyloxybenzophenone. Similarly, by using equivalent quantities of isoamyl bromide, propyl chloride, hexyl iodide, and octadecyl bromide, the corresponding 2-hydroxy-4'-alkoxybenzophenones are prepared.

A lacquer of the formulation given below is prepared by first dissolving the purified benzophenone ether product in the mixed lacquer thinner and then incorporating the other ingredients listed.

CLEAR LACQUER

```
                                              Parts by weight
Regular soluble nitrocellulose—½ second _____   8.0
Nondrying alkyd resin: Coconut oil-modified phthal-
  ic glyceride _____   9.6
Dioctyl phthalate _____  2.4
2-hydroxy-4'-dodecyloxybenzophenone _____   0.5
Thinner:
    n-butyl acetate _____ 16.0
    methyl isobutyl ketone _____  8.0
    n-butanol _____  8.0
    xylene _____ 47.5
```

Ponderosa pine panels are stained with an oil-soluble dark oak stain and three coats of the above lacquer are brushed onto one sample while a control panel is prepared by coating another of the stained panels with a clear lacquer differing only in that the benzophenone ether is omitted. Upon exposure to sunlight for a period of 12 months, it is observed that the control panel bleaches to a much lighter shade than the panel coated with the lacquer containing the ultraviolet absorber.

*Example 5*

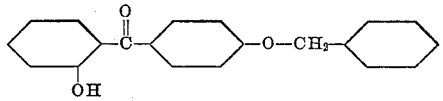

The procedure of Example 3 is followed using an equivalent amount of benzyl chloride in place of the butyl bromide. The product here is 2-hydroxy-4'-benzyloxybenzophenone.

On rolls heated to 300° F., 0.2 part of said benzophenone compound and 1.5 parts of an organic maroon pigment are milled into 98.3 parts of cellulose acetate. After thorough milling, the mass is stripped off as a sheet, granulated and then injection molded at 340° F. The product fades far less upon months of exposure to sunlight than a control object molded under the same conditions from a resin similar in all respects except that it contains none of the ultraviolet absorber.

*Example 6*

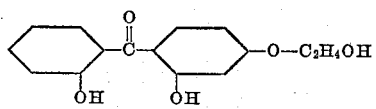

The procedure of Example 3 is followed using an equivalent amount of ethylene chlorhydrin in place of the butyl bromide, yielding 2-hydroxy-4-(2-hydroxyethoxy)benzophenone.

The above compound is introduced and tested into a cellulose acetate-butyrate resin in the manner described in the preceding example. Substantially the same results are obtained.

*Example 7*

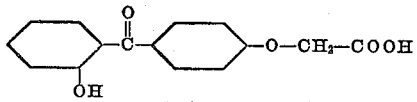

A mixture of 21.4 parts of 2,4'-dihydroxybenzophenone, 10 parts of chloracetic acid, 200 parts of dioxane, and 2 parts of pyridine is refluxed until the reaction is complete. The mixture is drowned in water and the crude 2-hydroxy-4'-carboxymethoxybenzophenone is washed. It is then purified by dissolving in aqueous sodium carbonate and reprecipitated with sulfuric acid.

This product is dissolved in a hot nylon spinning melt with thorough stirring to form a 0.05% by weight solution. After continuous filaments are extruded and processed in the usual manner, the yarn is woven into a sailcloth suitable for spinnakers and similar light-weight sails. This sailcloth is found to be considerably more resistant to yellowing in sunlight than sailcloth woven of untreated nylon yarns.

*Example 8*

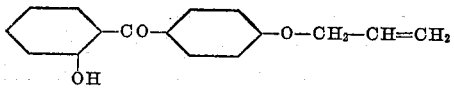

The procedure of Example 3 is followed, using an equivalent quantity of allyl bromide in place of the butylbromide, to give 2-hydroxy-4'-allyloxybenzophenone. By using methallyl bromide and crotyl bromide the similar methallyloxy and crotoxy compounds are obtained.

A copolymer of vinylidene chloride and vinyl chloride is fed into a heated compounding extruder along with the above allyloxybenzophenone compound in a weight ratio of 200:1, respectively, in producing a thin transparent sheet suitable for wrappings. A control sheet is prepared by simply shutting off the supply of the benzophenone derivative. Upon exposure to intense ultraviolet radiation for a long period, samples of the polymer containing the specified additive are found to be far more resistant to resin degradation than samples of the control sheet.

*Example 9*

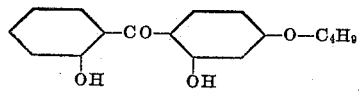

The procedure of Example 3 is followed, using an equivalent quantity (23 parts) of 2,2',4-trihydroxybenzophenone in place of the dihydroxybenzophenone, to yield the corresponding 2,2'-dihydroxy-4-butoxybenzophenone. By using equivalent quantities of lauryl bromide and octadecyl bromide the corresponding higher alkoxy compounds are similarly prepared.

A solution is formed of 0.2 part by weight of the above substituted benzophenone ether in a mixture of ring-substituted styrenes comprising 65% p-methyl styrene, 33% o-methyl styrene and 2% m-methyl styrene. This material is polymerized in bulk by first heating for three days at 100° C., then the temperature is increased to 130° C. for four days. The resulting polymer is milled with 1.0% of pigmentary titanium dioxide on rolls heated to 165° C. to thoroughly disperse the pigment and also to remove any unreacted monomer. Thereafter, the milled product is granulated and injection molded at 200° C. Upon prolonged exposure to ultraviolet light, it is observed that the molded product displays little yellowing in comparison with an article prepared in exactly the same manner with the benzophenone compound omitted.

*Example 10*

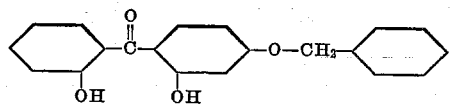

The procedure of Example 5 is followed using an equivalent amount of 2,2',4-trihydroxybenzophenone to form 2,2'-dihydroxy-4-benzyloxybenzophenone. With this ultraviolet absorber, a resin composition similar to that of Example 9 is made up and molded in the same way using 1% of the benzophenone derivative in the mixed methyl styrenes. The product displays substantially identical properties to that of Example 9.

*Example 11*

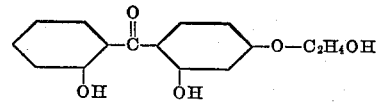

The procedure of Example 6 is followed, using an equivalent amount of 2,2',4-trihydroxybenzophenone in place of the dihydroxybenzophenone, to produce 2,2'-dihydroxy-4-(2-hydroxyethoxy)benzophenone.

A viscose dope is prepared using 270 parts by weight of alkali cellulose prepared in the customary way and containing 77 parts of cellulose, 24.3 parts of carbon bisulfide and 17.5 parts of sodium hydroxide. The carbon bisulfide is added in one portion and the mixture is agitated in a suitable dough mixer at about 20° C. for 22 hours. After xanthation is complete, the resulting mixture is diluted with 593 parts of water; then 10 parts of 2,2'-dihydroxy-4-(2-hydroxyethoxy)benzophenone is dissolved therein and produces a decided color as the solution is stirred for 1.5 hours. This solution is then aged at about 5° C. It contains 6.5% NaOH and 8.5 cellulose. Next, a vacuum is applied to remove air bubbles from the solution, and the material is regenerated in film form in the usual manner by extrusion through a slit into an aqueous bath containing 10% sulfuric acid, 1% zinc sulfate, 14% sodium sulfate, 10% glucose and the balance water. It is observed that the color in the dope disappears upon regeneration in the acidic bath, and it may be postulated that the original 2,2'-dihydroxy-4-(2-hydroxyethoxy)benzophenone is reconstituted from the sodium salt which is believed to form in the strongly alkaline dope. The continuous sheet is subjected to the usual washes and drying prior to applying a conventional moistureproof coating in the customary fashion. Upon testing this clear and substantially colorless cellulose sheet against a cellulose sheet manufactured in the same manner but containing no ultraviolet absorbing compound, it is observed that the treated sheet transmits only a small portion of the ultraviolet spectrum whereas the untreated sheet is almost completely transparent to ultraviolet light.

*Example 12*

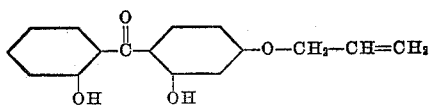

The procedure of Example 8 is followed, using an equivalent amount of 2,2',4-trihydroxybenzophenone in place of the dihydroxybenzophenone, to give 2,2'-dihydroxy-4-allyloxybenzophenone.

A clear thermoplastic sheet is formed from an intimate blend of 1 part of 2,2'-dihydroxy-4-allyloxybenzophenone, 100 parts of polyvinyl butyral resin and 40 parts of trioctyl phosphate (plasticizer). Safety glass is laminated in conventional manner using a sheet of this composition as the plastic interlayer, and the laminated glass is found to provide excellent protection from sunlight for auto upholstery fabrics.

*Example 13*

A mixture of 100 parts of polyvinylchloride (Geon 101, produced by B. F. Goodrich Co.), 50 parts of dioctyl phthalate, 2.0 parts of barium cadmium laurate, 1.0 part of a triphenylphosphite, and 0.2 part of 2-hydroxy-4'-methoxybenzophenone is milled and then molded at 325° F. The resultant composition shows improved resistance to ultraviolet light.

*Example 14*

A polyester resin is prepared by coreacting 3 mols of phthalic anhydride, 3 mols of fumaric acid and 6.6 mols of propylene glycol until esterification is substantially complete, as indicated by an acid number of about 30–40. Next, there is added monomeric styrene in a sufficient amount to equal ½ of the polyester resin present, and 0.02% by weight of ditertiarybutylhydroquinone based on the total weight of the unsaturated polyester and styrene. To 200 parts of this thermosetting resin is added 2 parts of lauryl mercaptan as a 10% solution in styrene, 2 parts of methyl ethyl ketone peroxide catalyst and 0.25% by weight of 2-hydroxy-4'-methoxybenzophenone. The mixture is cast into small panels which are cured for 18 hours at temperatures increasing from 125 to 250° F. They show little discoloration after many hours of exposure to ultraviolet light; whereas panels cast from the same resin with no benzophenone ether present develop a marked yellow appearance upon exposure to the same amount of ultraviolet light.

*Example 15*

Two surface coating formulations employing an acrylonitrile-modified styrenated alkyd resin prepared in the manner of Example 1 in Patent No. 2,748,092 are made up by simply stirring the following ingredients together to form a homogeneous solution:

| | Parts by weight |
|---|---|
| Resin | 50 |
| Xylene | 100 |
| Ultraviolet absorbing agent | 2–3 |

The coating composition according to the present invention contains 2 parts of 2,2'-dihydroxy-4-methoxybenzophenone and the other composition is a comparative one in which a greater quantity, 3 parts, of 2-hydroxy-4-methoxybenzophenone is incorporated. The latter compound is closely related in chemical structure and is achieving wide commercial acceptance as an ultraviolet absorbing agent. Each composition is flowed onto glass plates to the same depth and air dried at room temperature. The film of the present invention is tested at decreasing wave lengths of light, and it is found that light transmission is first reduced 50% at 400 millimicrons. After 660 hours exposure in an Atlas Fadeometer, the 50% cutoff is again determined and found to be unchanged at 400 millimicrons. This indicates that such exposure does not weaken the absorption characteristics of this composition.

The glass specimen coated with the comparative film is tested in exactly the same manner, and the 50% cutoff value is only 380 millimicrons initially and 370 millimicrons after exposure in the Fadeometer. Thus, it is apparent that even with a 50% greater quantity of ultraviolet absorber present, this surface coating absorbs less of the higher wave lengths of the ultraviolet spectrum and that the absorbency of the specimen is distinctly reduced upon exposure to ultraviolet radiation. All specimens are found to have excellent adhesion to the glass and accordingly are suitable coatings for shop windows to minimize the fading of merchandise on display from sunlight.

*Example 16*

Three compositions are milled using 100 parts of polyvinyl chloride (Geon 101), 50 parts of dioctyl phthalate, 2.0 parts of barium cadmium laurate and 1.0 part of triphenyl phosphite. One mixture is a control and each of the others further contain 0.2 part of one of the ultraviolet stabilizers designated hereinbelow. Sheets of uniform thickness are molded by the compression method at 325° F. from each sample. These are subjected to ultraviolet radiation in an Atlas Fadeometer under uniform conditions with inspection at regular intervals in an arbitrary test which is continued until ten black spots appear in each sample. This particular test is considered to be more reliable and reproducible in avoiding the variations and other irregular results obtained when the appearance of a single black spot is chosen as the criterion. In the test, the tenth black spot appeared in the control sample after 380 hours exposure, in the comparative example containing 2-hydroxy-4-methoxybenzophenone after 580 hours, and in the sample of the present invention using 2,2'-dihydroxy-4-methoxybenzophenone after 880 hours. This illustrates the superiority of the present compositions over prior art mixtures containing no ultraviolet absorbing agent and also those containing other ultraviolet absorbers.

*Example 17*

Unsaturated polyester resins are prepared in conventional manner using the following formulation in which the ultraviolet absorbing compound is introduced as a solution in the styrene:

| | Parts by weight |
|---|---|
| Styrene | 30 |
| Alkyd: | 70 |
|     Propylene glycol (2.2 mols) | |
|     Phthalic anhydride (1.0 mol) | |
|     Maleic anhydride (1.0 mol) | |
| Hydroquinone | 0.008 |
| Copper metal (in the form of the naphthenate) | [1] 0.15 |
| Ultraviolet light absorber | 0.25 |

[1] Parts per million.

Three resin samples are thoroughly mixed with a catalyst in the form of 1 part of a 50% solution of benzoyl peroxide in tricresyl phosphate and then poured into glass cells and cured for 9 hours at 120° F. with the temperature thereafter increasing to 250° F. for 8 hours and remaining at the latter temperature for an additional 2 hours. The resulting ⅛" thick castings are subjected to American Society for Testing Material standard Test No. D-620-49 using a General Electric Model S-1 sunlamp. A specimen according to the present invention wherein the ultraviolet absorbing compound is 2,2'-dihydroxy-4-methoxybenzophenone is found to withstand 578 hours of the standard radiation with a 10.5% decrease in reflectance of the standard visible wave length from the initial reflectance value. On the other hand, a comparative sample using the 2-hydroxy-4-methoxybenzophenone absorber, and therefore, not within the scope of the present invention, has a considerably greater reflectance drop in a much shorter intermal, namely, 11.5% decrease in 308 hours. A control sample is also run in which no absorbing agent whatsoever is employed and, in the test, its reflectance drops 10% in less than 40 hours.

*Example 18*

Using an elevated temperature, 0.1% by weight of 2,2'-dihydroxy-4-methoxybenzophenone is milled into polypropylene and the thoroughly blended mixture is formed into sheets of 0.02 inch thicknesses in a manner similar to Example 2. After 200 hours of exposure to ultraviolet light in a Fadeometer along with a control sheet of the same polypropylene containing no additives, it is found that the polymer in the control sheet is oxidized to a far greater extent than the polymer containing the substituted benzophenone.

While there are above disclosed only a limited number of embodiments of the compositions of the invention herein presented, it is possible to produce still other embodiments without departing from the inventive concept herein disclosed, and it is desired therefore that only such limitations be imposed on the appended claims as are stated therein, or required by the prior art.

We claim:

1. A composition of matter which comprises a substantially uniform molecular dispersion of between about 0.001 and about 15.0% by weight of a compound having the structural formula:

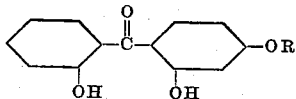

wherein R is alkyl in a carrier selected from the group consisting of polyethylene, polypropylene, polyvinyl chloride, a linear super polyamide obtained by condensing an aliphatic polymethylene diamine with an aliphatic dicarboxylic acid, and thermoplastic polymers of a styrene.

2. A composition of matter which comprises a substantially uniform molecular dispersion of between about 0.001 and about 15.0% by weight of 2,2'-dihydroxy-4-methoxybenzophenone in a carrier selected from the group consisting of polyethylene, polypropylene, polyvinyl chloride, a linear super polyamide obtained by condensing an aliphatic polymethylenediamine with an aliphatic dicarboxylic acid, and thermoplastic polymers of a styrene.

3. A composition of matter which comprises a substantially uniform molecular dispersion of between about 0.001 and about 15.0% by weight of 2,2'-dihydroxy-4-methoxybenzophenone in polyethylene.

4. A composition of matter which comprises a substantially uniform molecular dispersion of between about 0.001 and about 15.0% by weight of 2,2'-dihydroxy-4-methoxybenzophenone in polypropylene.

5. A composition of matter which comprises a substantially uniform molecular dispersion of between about 0.001 and about 15.0% by weight of 2,2'-dihydroxy-4-methoxybenzophenone in polyvinyl chloride.

6. A comopsition of matter which comprises a substantially uniform molecular dispersion of between about 0.001 and about 5.0% by weight of 2,2'-dihydroxy-4-methoxybenzophenone in a thermoplastic polymer of a compound of the group consisting of styrene and ring-substituted methyl styrenes.

7. A composition of matter which comprises a substantially uniform molecular dispersion of between about 0.001 and about 5.0% by weight of 2,2'-dihydroxy-4-methoxybenzophenone in polystyrene.

8. A composition of matter which comprises a substantially uniform molecular dispersion of between about 0.001 and about 5.0% by weight of 2,2'-dihydroxy-4-methoxybenzophenone in a linear superpolyamide obtained by condensing an aliphatic polymethylenediamine with an aliphatic dicarboxylic acid.

References Cited in the file of this patent

UNITED STATES PATENTS

| | | |
|---|---|---|
| 2,693,492 | Hoch | Nov. 2, 1954 |
| 2,777,828 | Day et al. | Jan. 15, 1957 |
| 2,819,247 | Lundberg | Jan. 7, 1958 |
| 2,822,340 | McGrovern et al. | Feb. 4, 1958 |
| 2,853,521 | Hardy et al. | Sept. 23, 1958 |

FOREIGN PATENTS

| | | |
|---|---|---|
| 159,895 | Australia | Nov. 19, 1954 |

UNITED STATES PATENT OFFICE
CERTIFICATE OF CORRECTION

Patent No. 2,976,259                          March 21, 1961

William B. Hardy et al.

It is hereby certified that error appears in the above numbered patent requiring correction and that the said Letters Patent should read as corrected below.

Column 2, line 70, for "ethyene" read -- ethylene --; column 4, TABLE I, fourth column, line 4 thereof, for "6.2" read -- 62.2 --; column 7, line 3, for "agent" read -- agents --; column 8, line 51, for "tricorballylate" read -- tricarballylate --; column 10, line 13, for "parts" read -- part --; column 15, line 1, for "intermal" read -- interval --; column 16, line 17, for "comopsition" read -- composition --.

Signed and sealed this 9th day of February 1965.

(SEAL)
Attest:

ERNEST W. SWIDER                                       EDWARD J. BRENNER
Attesting Officer                                           Commissioner of Patents